United States Patent [19]

Rybak

[11] 3,787,119

[45] Jan. 22, 1974

[54] CATHETERIZABLE MULTIPLE PHOTOMETER USABLE IN ANY PENETRABLE MEDIUM

[76] Inventor: Boris Rybak, Universite De Caen Faculte des Sciences Zoophysiologie, Caen, France

[22] Filed: Jan. 31, 1972

[21] Appl. No.: 222,169

[30] Foreign Application Priority Data
Jan. 29, 1971   France ............................... 7103675

[52] U.S. Cl. ................. 356/73, 23/230 B, 123/2 L, 356/39, 356/41, 356/180, 356/222
[51] Int. Cl. ..... G01n 21/00, G01n 33/16, G01j 1/42
[58] Field of Search ..... 356/40, 41, 229, 39, 72, 73, 356/180, 181, 182, 184; 250/227, 222; 210/321; 128/2 L, 2.05 E, 2.05 D, 2.05 F, 2.1 E, 2 E; 23/230 B

[56] References Cited
UNITED STATES PATENTS

| | | | |
|---|---|---|---|
| 3,300,385 | 1/1967 | Danon ................................. | 356/40 |
| 3,461,856 | 8/1969 | Polanyi ................................ | 356/41 |
| 3,123,066 | 3/1964 | Brumley ............................... | 356/41 |
| 3,068,742 | 12/1962 | Hicks, Jr. et al ..................... | 356/41 |
| 3,437,747 | 4/1969 | Sheldon ............................... | 250/227 |

FOREIGN PATENTS OR APPLICATIONS
1,526,973   4/1968   France

OTHER PUBLICATIONS

"Colorimetry"; Shurkus; Radio News; June, 1944; pgs. 25–27, 56, 58, 60 & 71.

*Primary Examiner*—Ronald L. Wibert
*Assistant Examiner*—V. P. McGraw

[57] ABSTRACT

The device of the invention is constituted by a multiple photometer mounted in a catheter and comprising at least two associated photosensitive cells placed at a certain distance from one another and separated by open spaces called dish-members and at least one microlamp for energizing the said photosensitive cells.

Said device allows continuous measurements, particularly in blood in vivo, of physical and chemical characteristics by means of natural or artificial colouring matters.

7 Claims, 2 Drawing Figures

CATHETERIZABLE MULTIPLE PHOTOMETER USABLE IN ANY PENETRABLE MEDIUM

In applicant's prior French Pat. No. 1.526.973 granted on Apr. 22, 1968 and entitled "Device for photometry in any penetrable medium," there was described a catheterizable photometric pick-up device assembled with an open dish-member positioned between a front microlamp and a photodiode the assembly being disposed at the end of a catheter. The French device was either directly responsive to the luminous flux of the lamp or indirectly through the medium of a filter such as a coloured screen. This colourimetric device permitted both continuous in situ and in vitro evaluation of blood-colour variations which for example, depend on the degree of oxygenation of the haemoglobin pigment. More particularly, the said device allowed continuous evaluation of the circulating blood mass by means of colour blood-flux indicators which were not eliminable rapidly and also in situ evaluation of, for example, ammoniemia, glycemia, etc., by means of membranes of different selectivities secured on the apertures of the dish-member and of materials which produce a coloured reaction with the substance under test, said materials being introduced between the photodiode and the microlamp.

The present invention relates to a microprobe device permitting absolute photometric measurements including nephelometry; i.e. measurement of chemical reaction opalescence or of microbial growth, or, of blood color variations resulting from oxygenated haemoglobin. The microprobe device is also capable of measuring physical characteristics such, for example, as the continuous, direct and in situ determination of the pressure and of the $dx/dt$ blood-rate in a vessel of suitable size or of any other fluid, channelled or not.

The present invention is also applicable for the measurement of other physical characteristics, such as blood mass, and accordingly the examples given are for illustrative purposes only and are not to be considered as restrictive. Thus, the present invention is not limited to vascular catheterizing in human beings and animals. The device of the invention can be used in any penetrable medium (any hollow organ, jelly, gas, various liquids, cosmic spaces).

The device of the present invention is constituted essentially by at least two photometric assemblies which are advantageously of the type described in the aforementioned patent and the arrangement of which, in relation to one another and to the catheter portions which penetrates the region of measurement, is different depending upon whether the flow rate of the fluid, for example blood, is to be measured or whether physical characteristics (including the physical-chemical characteristics of the medium, such as the oxyhaemoglobin rate) are to be determined photometrically.

Where measurement of the flow rate of a coloured fluid is to be made, the microlamp, for instance from 1 to 3 mm in diameter, the operating voltage of which may be from 1 to 3 volts is positioned few millimeters distance from a photocell (photodiode, photoconductive cell, photovoltaic cell) the photocells being arranged a predetermined distance from one another and from the microlamp. The photometric devices constituting photocell means and microlamp means, hereinafter referred to as cell elements, may be constituted of a tube of a metal, which is not subject to by the medium, and, as far as the apertures are concerned, they may be premoulded during the manufactured of the catheter. If not, the said apertures may subsequently be cut directly in the catheter. The arrangement is the same as the one described in the aforementioned prior patent. The distance between the said photoelectric pick-up devices of one and the same type or of different types is advantageously 15 cm, without this distance being limitative. The device operates by injection into the fluid flow of a colouring matter which, in the case of blood, may advantageously be a colouring matter which is relatively rapidly eliminated from the blood (such as "cardiogreen,"), so as to allow multiple measurements at near intervals of time in clinical, laboratory or on-site conditions. Since each cell element is independent of the other, the registration of the flux of colouring matter is performed on an external device according to two electrical signals derived from the two photoelectric cells. The mounting of this double photometer is the same as that of the single photometer described in the aforementioned prior patent, the electrically insulated connecting wires of the active components of the front cell (i.e., the microlamp and the photocell) passing along the internal cylinder in the space left during the mounting of the microlamp and of the photocell of the proximal photometric assembly. Of course, this double photometer may also be used to determine the blood mass, as in the single photometer, by, for example, diluting blood with a colouring material of long persistence such as Evans blue.

On the other hand, the device according to the invention may also serve as a true photometer enabling instantaneous and continuous in situ measurements of, for example, the oxygenated state of haemoglobin. To this end, at least two photoelectric elements are arranged in longitudinal spaced relation to one another, at the end of the catheter so that the photosensitive surfaces of each photocell are in confronting relationship to a single microlamp disposed between the apertures associated with the photoelectric elements and through which the fluid, i.e., blood, passes. This arrangement utilizing a single lamp has the advantage of being economical, compact and has the added advantage that the two photocells receive a luminous flux from a single source of the same colour temperature, i.e., from a source of the same quality. The invention however covers any other arrangements on a catheter using several lamps for several photocells. The photocells used may be photodiodes, photovoltaic cells or photoconductive cells. In any case, it is advantageous to use photocells whose diameter is small, for instance 2 mm, and, in order to provide an absolute reference, one of the coupled photocells will operate without a filter (i.e., will respond in accordance with its own response characteristic) although, according to the invention, it may be filtered to obtain a definite absorbtion spectrum. The other coupled photocell must necessarily have a response characteristic different from the first one and it is advantageous, to this end, to provide a filter, for example a green filter for the haemoglobin system. The invention therefore encompasses structures of photovoltaic cells, photodiodes, photoconductive cells utilizing coloured filters and, when necessary, a so-called catathermal anticaloric filter, a filter which renders the cell highly insensitive to infra-red rays. The location of the optical filter or the thermal filter is not critical and may be placed frontally or sub-frontally and on or in front of the photocell or on and in front of the light source.

Use of photoconductive cells permits, the device according to the invention to be supplied directly from an electric source whose direct or alternative voltage may range from a few microvolts to several hundreds of volts, depending upon the type of photoconductive cell used and its use in the system. Counter-current arrangements are contemplated for use with the device of the invention permitting operational control. A series connected galvanometer will provide a reading When of the magnitude of the current generated when light radiation reaches the photosensitive cell from the light source. When requiring high sensitivity is required the photoconductive cell may be connected in a Wheatstone bridge.

The photoelectric elements may be either independently mounted, thus providing at least two registrations, or in series, in which event they combine to provide a registration along a single path, for example where use is made of two photoelectric cells having different adapted spectra.

The various components (in particular the microlamps and the photocells) are secured to the catheter by means of suitable cements or resins. Depending upon the position of the lamp, the system may be operated with diffused light by employing fluorescent substances.

The device according to the invention may also serve to measure pressure. To this end, the apertures of one or several photometric cell elements are sealingly covered with a thin resilient membrane of, for instance, silastene In the internal cylinder portion of this membrane, in particular the portion of greatest resiliency, is secured (in most cases perpendicularly) a membrane which is subject to pressure displacement in the cell elements between a microlamp and a photocell, the luminous flux variation thus obtained being proportional to precalibrated pressures of predetermined orders of magnitude. In short, the device used in this case is that of a diaphragm in the shape of a photometric wedge.

The device according to the invention may advantageously comprise a pick-up device of any type (measuring for instance $P_{O_2}$, pH, $P_{CO_2}$) or mechanical devices provided with rotary motions or reciprocating motions, or optical devices (for instance of the lazer, impulse, or polarized-light type) or electronic devices capable, in particular, of being used for the measurement of pressure, temperature, or assemblies using combinations of these devices.

It is also possible to mount on a single catheter, by suitably placing the pick-up devices at the head of the catheter and simultaneously, owing to the open spaces corresponding to the open dish-members, to measure for instance thirteen parameters simultaneously, e.g. $P_{O_2}$, pH, $P_{CO_2}$, state of saturation of the haemoglobin with oxygen, glycemia, speed, mass, rate and pressure of blood, electrocardiogram, $P_{Na}+$, $P_K+$, $P_{Ca}++$, (the magnitudes P being the partial pressure or the concentration).

Figures 1, 2:
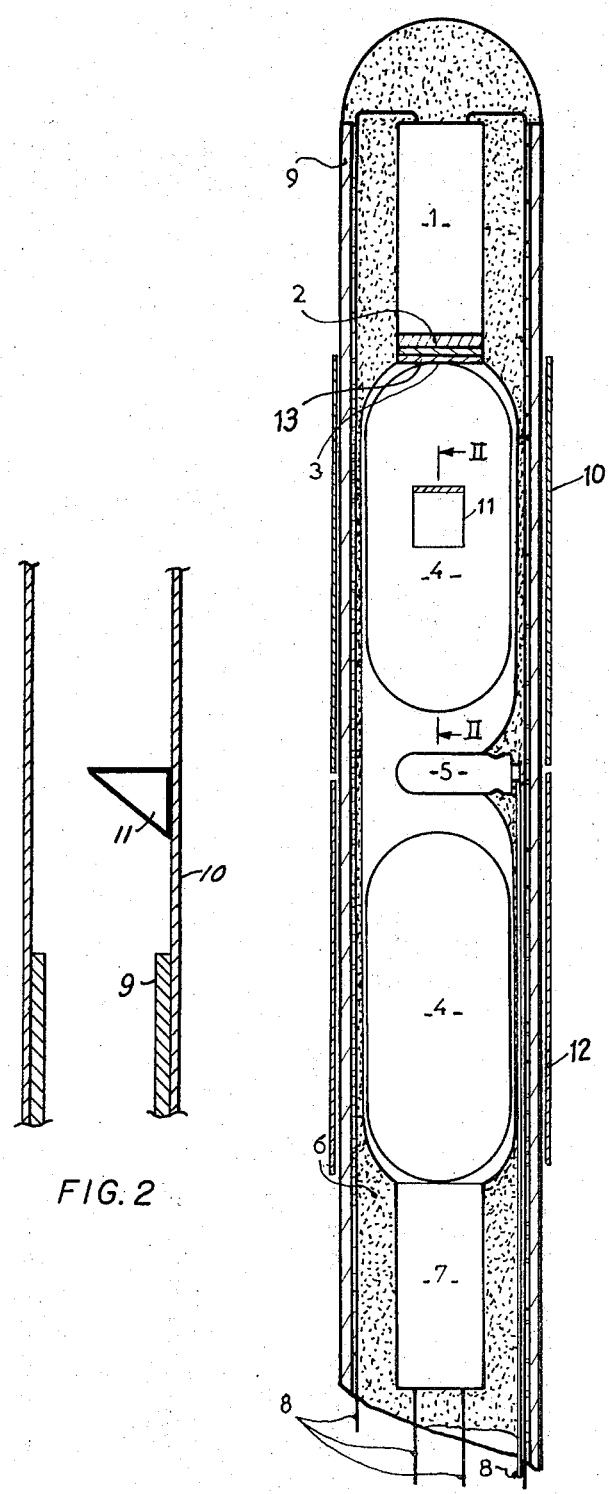
FIG. 1 shows a longitudinal section of a device according to the invention.
FIG. 2 is a section taken through line II—II in FIG. 1.

The said device comprises a catheter 9, two photosensitive cells 1 and 7, two open-dish members 4, a microlamp 5, leads 8 connected to the said cells, two elements 2 and 3 and a filling material 6.

The device according to the invention may be used in all cases where a variation in colour or opacity of a fluid or jelly is to be measured accurately and continuously, more especially in laboratory conditions, in the physiological, microbiological, chemical, physical, medical and pharmaceutical fields, in any space craft, on any celestial body, in limnology, oceanography, in industry or control works, research work, manufacturing, or home uses or for uses in the field of arts.

The inventive probe may also be used, as above described, to measure pressure. For this purpose one or more resilient imperforate membranes 10 may be provided about the cell elements as shown in FIG. 1. To the inner wall portion of the membrance 10 in the zone of the open dish-member, where the membrane has its greatest resilience, there is secured in generally perpendicular relation to light transmission from microlamp 5 a wedge member 11 for pressure displacement as previously described.

Instead of imperforate membranes, it will be obvious that permeable membranes can also be used where flow through the membrane is desired. For expedience of representation in the drawing, the permeable membrane is shown in FIG. 1 at 12. While FIG. 1 illustrates an imperforate membrane 10 in conjunction with a permeable membrane 12 it will be understood that generally like membranes will be used for a given test. Filter means 12 is shown in FIG. 1 in association with photosensitive element 1.

The invention is not limited to the embodiment described and illustrated, which has been given by way of example only. In particular, it comprises all the means constituting technical equivalents to the means described as well as their combinations, should the latter be carried out according to the spirit of the invention.

What is claimed is:

1. A microprobe comprising an elongated tubular member of relatively small diameter having therewithin photosensitive element means and microlamp means, dish-like means within said tubular member adapted to receive a circulating fluid and being disposed between and separating said photosensitive element means and microlamp means, said tubular member being provided with apertures communicating with said dish-like means, said apertures constituting an inlet and an outlet for the circulating fluid, said dish-like means comprising two independent open dish-like members each for making different tests and having interposed therebetween said microlamp means, said photosensitive element means comprising two independent photosensitive elements, each associated with said microlamp means and one of said independent dish-like members for providing an electrical signal related to said different tests made by each of said dish-like members, light transmissions between the microlamp means and each of said photosensitive elements, while the fluid is in the environ of said dish-like members, being substantially symmetrical.

2. A microprobe according to claim 1, wherein said elongated tubular member comprises a catheter member.

3. A microprobe according to claim 1, including filter means associated with at least one of said two photosensitive elements.

4. A microprobe according to claim 1, including a filler material which excepting for said two dish-like members fill the space within said elongated tubular member, said filler material serving to attach said microlamp means and said photosensitive element means within said tubular member.

5. A microprobe according to claim 1, wherein said elongated tubular member further includes a permeable membrane mounted over said apertures.

6. A microprobe according to claim 1, wherein said elongated tubular member includes resilient imperforate membrane means mounted in the region of said dish-like means, said imperforate membrane means having fixed thereon a photometric wedge.

7. A microprobe according to claim 2, wherein said photosensitive elements are longitudinally spaced from the other in the forward tip end portion of the catheter with said dish-like members therebetween, said dish-like members having adjacent end portions spaced from one another, said microlamp means comprising a single microlight source positioned in said space between said dish-like members transversely to the longitudinal extent of the catheter.

* * * * *